(12) United States Patent
Devonport et al.

(10) Patent No.: US 7,638,576 B2
(45) Date of Patent: Dec. 29, 2009

(54) AQUEOUS DISPERSION OF EPOXY GROUPS-BEARING MULTI-STAGE POLYMERIC PARTICLES

(75) Inventors: Wayne Devonport, Doylestown, PA (US); Ralph Craig Even, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 350 days.

(21) Appl. No.: 11/583,303

(22) Filed: Oct. 19, 2006

(65) Prior Publication Data
US 2007/0100074 A1    May 3, 2007

Related U.S. Application Data

(60) Provisional application No. 60/732,004, filed on Nov. 1, 2005.

(51) Int. Cl.
*C08K 3/20* (2006.01)
*C08F 265/02* (2006.01)

(52) U.S. Cl. .................. 524/556; 524/564; 525/255; 525/261; 525/286

(58) Field of Classification Search .................. None
See application file for complete search history.

(56) References Cited

U.S. PATENT DOCUMENTS 4,794,152 A * 12/1988 Kobashi et al. ............. 526/273
5,744,540 A    4/1998 Baumstark et al.
5,869,568 A    2/1999 Maeda
2003/0153676 A1 8/2003 Brinkhuis et al.

FOREIGN PATENT DOCUMENTS

EP    0 846 727 A2    6/1998

OTHER PUBLICATIONS

K 2001: Materials review, Plastics Additives & Compounding, Dec. 2001, 12 pages.*

* cited by examiner

*Primary Examiner*—Robert Sellers
(74) *Attorney, Agent, or Firm*—Andrew E. C. Merriam

(57) ABSTRACT

According to the present invention, aqueous multi-stage polymer dispersions comprising an acid-functional first polymer and an epoxy-functional second polymer, wherein 90 mole % or more of the said epoxy groups, based on the moles of epoxy groups in the monomer mixture used to form the second polymer, are retained in the aqueous dispersion after said dispersion is stored in a sealed container for 10 days at 60° C. Further, methods of making the aqueous multistage polymer dispersion comprise polymerizing the monomers used to make the second polymer in the presence of an aqueous dispersion of the first polymer. Preferably, the second polymer is formed in the presence of 0.3 wt. % or less, based on the total weight of the first polymer and the ingredients to form the second polymer, of one or more strong acid surfactant, and 3) 0.1 wt. % or less, based on the total weight of the first polymer and the ingredients to form the second polymer, of one or more initiator that contains strong acid groups or generates strong acid groups under the conditions of aqueous emulsion polymerization. The aqueous dispersions provide non-toxic, odor free storage stable coating compositions that form coatings having excellent film toughness and hardness.

11 Claims, No Drawings

1

AQUEOUS DISPERSION OF EPOXY GROUPS-BEARING MULTI-STAGE POLYMERIC PARTICLES

This application claims the benefit of U.S. Patent Application No. 60/732,004 filed on Nov. 1, 2005.

The present invention relates to multi-stage aqueous emulsion polymers comprising storage stable epoxy groups and methods for making them. More particularly, the present invention relates to aqueous emulsion polymers comprising one or more first polymers of one or more non-ionic ethylenically unsaturated monomers and one or more second polymers of one or more epoxy group containing ethylenically unsaturated monomers and methods for making them.

Environmental pressures and evolving performance requirements have led to the displacement of organic solvent-borne polymer systems by water based polymer systems in many important commercial uses, including protective and decorative coatings. However, there continues to be a need for improvement in some key performance attributes of aqueous emulsion polymers, particularly the toughness and/or hardness of films formed from aqueous emulsion polymers without compromising desirable film formation characteristics. It has long been recognized that post film formation crosslinking can achieve this goal. However, most of the chemistries suitable for post film formation crosslinking have provided inadequate storage stability properties in the aqueous environment to enable utility in many uses.

U.S. Pat. No. 5,869,568, to Maeda et al., discloses a method of manufacturing a one-part cold crosslinking emulsion composition comprising preparing a fine grain containing, as component (A), a copolymer comprising an epoxy group-containing monomer and an ethylenic unsaturated monomer in an aqueous medium; and covering a periphery of the fine grain made of Component (A) with component (B), a copolymer comprising an unsaturated carboxylic acid and an ethylenic unsaturated monomer; so as to prepare a double-structure fine grain, wherein the method further comprises a step of containing Component (C), a low molecular weight monofunctional epoxy compound, in one or more of Components (A) and (B). While the Maeda et al. emulsions exhibit adequate storage stability, the Maeda et al. process is time consuming, taking no less than 4 hours in Example 1, excluding cooling time. Further, Maeda et al. rely on toxic low molecular weight epoxy compounds, which have a gasoline odor and are unsuitable for use in paints, coatings, adhesives or any other material used in the home or office.

The instant applicants have sought to provide storage stable, low-toxicity and odor free, curable aqueous polymers comprising storage stable epoxy groups.

STATEMENT OF INVENTION

In accordance with the present invention, the present inventors have endeavored to provide aqueous emulsion polymers comprising copolymerized epoxy functional monomers wherein the epoxy functionalities are preserved, even during storage under relatively harsh conditions. Further, the present inventors have discovered aqueous emulsion polymerization process by which such polymers can be formed.

In one embodiment, the present invention provides aqueous polymer dispersions comprising multi-stage polymeric particles of from 20 wt. % to 80 wt. %, based on the weight of the polymeric particles, of one or more first polymers formed by polymerizing a first monomer mixture of a) one or more non-ionic ethylenically unsaturated monomers and b) 0.5 wt. % to 10 wt. %, based on the total weight of monomers a) and b), of one or more ethylenically unsaturated acid monomers, and one or more second polymers, formed by polymerization in the presence of an aqueous dispersion of the one or more first polymer of a second monomer mixture comprising from 1 to 90 wt. %, based on the weight of the second monomer mixture, of one or more epoxy group-containing ethylenically unsaturated monomers. According to the present invention, 90 mole % or more of the epoxy groups in the second polymer, based on the moles of epoxy groups in the second monomer mixture, are retained in the aqueous dispersion after storage in a sealed container for 10 days at 60° C.

The one or more first polymers, the one or more second polymers, or both, may be formed in the presence of 0.3 wt. % or less, based, as appropriate, on the total weight of the first polymers or on the total weight of the first polymer and the ingredients to form the second polymer, of one or more strong acid surfactants. Further, the one or more first polymers, the one or more second polymers, or both, may be formed in the presence of 0.1 wt. % or less, based, as appropriate, on the total weight of the first polymers or on the total weight of the first polymer and the ingredients to form the second polymer, of one or more initiators that contain strong acid groups or generate strong acid groups under the polymerization conditions. Still further, one or more neutralizing agents may be present during the forming of the one or more first polymers, the neutralizing agents present in amounts sufficient to neutralize 5% or more, on an molar equivalents basis, of the acid groups in the first monomer mixture.

The one or more second polymers may be formed in the additional presence of redox initiation systems comprising one or more oxidants and one or more sulfinic acid derivatives. In one embodiment, 50 wt. % or more of the second monomer mixture are polymerized at temperatures of 70° C. or lower.

The present invention provides coating and/or adhesive compositions comprising aqueous multi-stage polymer dispersions, or, alternatively, powder coatings. The coating compositions may further comprise one or more crosslinkers capable of reacting with epoxy groups.

Still further, the present invention provides processes for forming multi-stage polymeric particles of the one or more first polymers and the one or more second polymers, as set forth above, and for forming aqueous dispersions of multi-stage polymeric particles. The processes for forming aqueous dispersions of multi-stage polymeric particles comprise providing an aqueous dispersion of one or more first polymers and polymerizing in the presence of the aqueous dispersion of the first polymer a second monomer mixture comprising from 1 to 90 weight %, based on the total weight of the second monomer mixture, of one or more ethylenically unsaturated monomers bearing one or more epoxy groups. Further, the second monomer mixture may be polymerized in the presence of 1) the aqueous dispersion of the first polymer, 2) 0.3 wt. % or less, based on the total weight of the first polymer, of one or more strong acid surfactant, and 3) 0.1 wt. % or less, based on the total weight of the first polymer, of one or more initiator that contains strong acid groups or generates strong acid groups under the conditions of polymerization.

The processes for forming the first polymer may comprise polymerizing the first monomer mixture in aqueous media or in solvent-based media, followed by drying or removal of the solvent and addition of water, or followed by inversion and removal of solvent to form an aqueous dispersion of the first polymer. Preferably, the polymerization of the second monomer mixture is conducted in the presence of redox initiation systems comprising one or more oxidants and one or more sulfinic acid derivatives, wherein 50% or more of second monomer mixture is polymerized at temperatures of 70° C. or lower.

The present invention provides multi-stage aqueous emulsion polymers bearing epoxy groups that are formed in such a fashion as to limit the reaction of the epoxy groups prior to film formation. Whereas epoxy groups are subject to a variety of chemical reactions when stored in an aqueous environment, the polymers of the invention exhibit excellent retention of epoxy functionality throughout the process of polymerization as well as upon storage. By "retention of epoxy functionality" herein is meant that the epoxy ring does not undergo chemical reaction and is retained in the following formula (I):

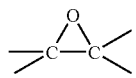

(I)

The aqueous multi-stage polymer dispersions of the present invention retain 90 mole % or more of epoxy groups, based on the total moles of epoxy groups in the second monomer mixture, after storage in a sealed container, at a Ph of 7.0 or greater, for 10 days at 60° C. In retaining such levels of epoxy functionality, the aqueous dispersions of the present invention allow for the increasingly efficient use of epoxy functional monomers. Further, the limited pre-film formation crosslinking of the epoxy functional polymer particles of the present invention provides for improved film formation in addition to ultimate film toughness, film hardness, or both. Desirable coating properties related to film toughness and hardness include scrub resistance, tensile strength, block resistance, print resistance, and dirt pick-up resistance. Still further, the aqueous dispersions having stable epoxy groups exhibit improved coating performance even after prolonged storage.

All ranges recited are inclusive and combinable. For example, an average particle size of 1.3 μm or more and up to 4.5 μm, for example, 1.5 μm or more and up to 4.0 μm, will include ranges of 1.3 μm to 4.5 μm, 1.5 μm to 4.5 μm, 1.5 μm to 4.3 μm, and 1.3 μm to 4.3 μm.

Unless otherwise indicated, all temperature and pressure units are standard temperature and pressure (STP).

All phrases comprising any parentheses denote either or both of the included parenthetical matter and its absence. For example, the phrase "(co)polymer" includes, in the alternative, polymer, copolymer and mixtures thereof.

As used herein, the phrase "aqueous" or "aqueous solvent" includes water and mixtures comprising water and one or more water-miscible solvent.

As used herein, the phrase "gradual addition process" means a polymerization process in which monomers are added to a reaction vessel as polymerization occurs.

Unless otherwise specified, the term "Mn", as used herein, refers to the number average molecular weight as determined by size exclusion chromatography (SEC) using EasiCal PS-2TM polystyrene standards supplied by Polymer Laboratories.

Unless otherwise specified the term "Mw", as used herein, refers to the weight average molecular weight as determined by SEC using EasiCal PS-2TM polystyrene standards supplied by Polymer Laboratories.

As used herein, the phrase "neutralizer" means any basic material which is capable of entering into an acid-base reaction with an acid.

As used herein, the phrase "nonionic monomer" refers to monomers, the copolymerized monomer residue of which does not bear an ionic charge between pH=1-14.

Unless otherwise specified, the term "particle size" as used herein refers to the effective particle diameter as determined by dynamic light scattering, using a Brookhaven 90Plus Particle Size Analyzer (Brookhaven Instruments Corporation, Holtsville, N.Y.), with sample preparation and calibration as specified by the instrument manufacturer.

As used herein a "shot process" refers to a process in which a quantity of monomer is introduced to a reaction vessel under conditions where little or no polymerization is occurring and the monomers are subsequently caused to polymerize.

As used herein, the phrase "strong acid" means any compound having one or more pKa of 4.0 or less in water.

As used herein, the phrase "strong acid initiator" means any initiator that either contains strong acid groups or generates strong acid groups under the conditions of aqueous emulsion polymerization.

As used herein, the phrase "strong acid surfactant" means any surfactant that comprises a group having a pKa of 4.0 or less in water.

As used herein, the phrase "Tg", means the glass transition temperature as determined by modulated differential scanning calorimetry (modulated DSC) using a heating rate of 7° C./minute, modulated 1° C. every 40 seconds, taking the mid-point in the heat flow versus temperature transition as the Tg value.

As used herein, the phrase "volatile organic compound" ("VOC") means any carbon containing compound having a boiling point below 280° C. at atmospheric pressure, excluding compounds such as water and ammonia.

As used herein, the phrase "wt. %" stands for weight percent.

First polymers may be formed by the polymerization of one or more ethylenically unsaturated monomers by any means known in the art including solution, emulsion, miniemulsion, microemulsion, or suspension polymerization processes. Preferred is aqueous emulsion or miniemulsion polymerization. The practice of emulsion polymerization is discussed in detail in D. C. Blackley, *Emulsion Polymerization* (Wiley, 1975) and H. Warson, *The Applications of Synthetic Resin Emulsions*, Chapter 2 (Ernest Benn Ltd., London 1972).

In forming first polymers, the reaction temperature may be maintained at temperatures of 100° C. or lower throughout the course of the reaction. Preferred are reaction temperatures range between 30° C. or more, or, more preferably, 50° C. or more, and up to 95° C., more preferably, up to 90° C.

If first polymers are polymerized by solvent-based polymerization methods, or if (co)solvents are used, the polymers may be subsequently be converted to aqueous dispersions by means known in the art. For example, the (co)solvent(s) may be removed by drying or by volatilizing off solvent before adding aqueous media, or by volatilizing off solvent in the presence of water, or while adding, or after adding water to form the dispersion.

Suitable ethylenically unsaturated acid monomers for making the first polymer(s) include, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)

acrylate, phosphoalkyl crotonates, phosphoalkyl maleates, phosphoalkyl fumarates, phosphodialkyl (meth)acrylates, phosphodialkyl crotonates, and allyl phosphate. Acid monomers used to form first polymers may include, for example, one or more acid functional macromonomers and polymerizable anionic surfactants. Preferred for use in the formation of first polymers are ethylenically unsaturated monomers bearing 1 or 2 carboxylic acid groups.

Suitable acid functional macromonomers may include, for example, any low molecular weight polymer formed from one or more kinds of acid containing monomer that has one or more terminal ethylenically unsaturated groups that are capable of being polymerized in a free radical polymerization process. Preferably, the amount of acid containing monomer in the acid containing macromonomer ranges from 50 wt. % or more and up to 100 wt. %, more preferably, 90 wt. % or more and up to 100 wt. %, and most preferably, 95 wt. % or more and up to 100 wt. %. Such acid containing macromonomers may be prepared according to any technique known to those skilled in the art, for instance by a solution polymerization process using a free radical initiator and transition metal chelate complex as disclosed in U.S. Pat. No. 5,721,330 to Ma.

Useful ethylenically unsaturated nonionic monomers for the first and the second polymer(s) may include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, styrene, substituted styrenes, ethylene, butadiene; vinyl acetate, vinyl butyrate and other vinyl esters; vinyl monomers such as vinyl chloride, vinyl toluene, and vinyl benzophenone; and vinylidene chloride.

The first and/or second polymer(s) may additionally contain copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

In addition to the one or more ethylenically unsaturated acid monomers and nonionic monomers, the one or more first polymers may comprise the polymerization product of 0.1 wt. % or more, preferably 0.5 wt. % or more, based on the total weight of the first polymer, of one or more amide functional ethylenically unsaturated monomers, such as, for example, acrylamide or methacrylamide, or of one or more hydroxy functional monomers, such as, for example, hydroxyethyl methacrylate and hydroxyethyl acrylate, or mixtures or combinations thereof. Monomers used to form the first polymer may comprise up to 3 wt. %, or up to 4.5 wt. %, and, preferably, up to 2 wt. %, based on the total weight of the first polymer, of one or more ethylenically unsaturated monomers monomers chosen from amide functional monomers, hydroxy functional monomers, mixtures and combinations thereof.

The first and/or second polymer(s) may also contain copolymerized surfactants, i.e., polymerizable surfactants comprising one or more hydrophobic segments and one or more hydrophilic segments. Within the scope of this invention, polymerizable surfactants may comprise one or more ethylenically unsaturated carbon-carbon bonds which can undergo free radical addition polymerization. A representative hydrophobic segment is an alkyl chain comprising 10 to 20 carbon atoms. The hydrophilic segment may be anionic or non-ionic. Suitable anionic functional groups for use in the first polymer may include, for example, sulfonate, phosphonate, and carboxylate ions. Suitable non-ionic surfactants and some anionic surfactants may include surfactants exhibiting ethoxy or propoxy group hydrophilicity, for example, 1 to 40 ethyleneoxy group or propyleneoxy group units.

Examples of anionic polymerizable surfactants include MAXEMUL™ 6106, MAXEMUL™ 6112, MAXEMUL™ 5011, MAXEMUL™ 5010 (all available from Uniqema (New Castle, Del.); polyoxyethylene alkylphenyl ether ammonium sulfates, sold as HITENOL BC-10™, HITENOL BC-1025™, HITENOL™ BC-20, HITENOL BC-2020™, HITENOL™ BC-30 (Montello, Inc., Tulsa, Okla.), and allylsulfosuccinate derivatives, such as TREM™ LF-40 (Cognis Corporation, Cincinnati, Ohio).

Preferably, the first polymer is formed by emulsion polymerization of the one or more non-ionic ethylenically unsaturated monomers and the ethylenically unsaturated acid monomers in the presence of 0.1 wt. % or less, based on the total weight of the first polymer, strong acid initiator. More preferably, the first polymer is formed in the presence of 0.05 wt. % or less, most preferably 0%, based on the total weight of the first polymer, of strong acid initiator. Least desirable are initiators which form strong acid groups on the polymer chains of the inventive polymers or which contain or generate species having one or more pKa of 3.0 or less. Strong acid initiators may include, for example, ammonium and/or alkali metal persulfates, sodium perborate, perphosphoric acid and salts thereof, potassium permanganate, and ammonium or alkali metal salts of peroxydisulfuric acid. The persulfates, for example, may form sulfuric acid upon decomposition in water and/or generate sulfate end-groups on polymer chains formed in their presence.

In another preferred embodiment, the first polymers may be formed in the absence of strong acid surfactants, for example, 0.5 wt. % or less, more preferably, 0.3% or less, yet more preferably, 0.1 wt. % or less, and most preferably, 0 wt. %, based on the total weight of the first polymer. Strong acid surfactants may include any surfactants comprising groups having one or more pKa of 4.0 or less, or of 3.0 or less. Strong acid surfactants include, for example, alkali metal or ammonium salts of alkyl, aryl, or alkylaryl sulfates, sulfonates, phosphates, or phosphonates; alkyl sulfonic acids; sulfosuccinate salts.

In yet another preferred embodiment, the first polymer may preferably be formed in the presence of 0.01 wt. % or more and up to 5 wt. %, more preferably, 0.05 wt. % or more and up to 3 wt. %, and yet more preferably, up to 0.5 wt. %, based on the weight of monomers used to form the first polymer, of one or more free radical initiators that does not contain, or form upon reaction in emulsion polymerization, strong-acid groups. Examples of suitable initiators may include, for example, hydrogen peroxide, sodium peroxide, potassium peroxide, t-butyl hydroperoxide, t-amyl hydroperoxide, cumene hydroperoxide, and various azo initiators. Organic hydroperoxides including, for example, t-butyl and t-amyl hydroperoxide are preferred.

Suitable initiators may serve as oxidants in redox initiation systems comprising one or more oxidants and one or more reductants. Suitable reductants include, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydro sulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. In some embodiments utilizing redox initiation systems, the use of sulfinic acid derivatives as reductants is preferred. The use of sulfonic acid derivatives as reductants may be preferred. Mixtures of sulfinic acids and sulfonic acids may be used as well. Suitable sulfinic acid derivatives are described in U.S. Pat. No. 6,586,622 B2, to Berghofer and Rothmann. Suitable sulfinic acid reductants may include, for example, alkylsulfinic acids, such as isopropyl sulfinic acid; aryl sulfinic acids, such as phenylsulfinic acid; and hydroxy-alkyl sulfinic acids, such as hydroxymethane sulfinic acid and 2-hydroxy-2-sulfinatoacetic acid; and salts of the preceding acids. Reductancts may be used in amounts of 0.01 wt. % or more and up to 3.0 wt. %, preferably up to 0.5 wt. %, and, more preferably, 0.025 wt. % or more and up to 0.25 wt. %, based on the weight of monomers used to form the first polymer. Preferred are sulfinic acid derivatives which do not generate formaldehyde under the conditions of aqueous emulsion polymerization. Preferred reductants include 2-hydroxy-2-sulfinatoacetic acid and 2-hydroxy-2-sulfonatoacetic acid. Suitable commercially available products include, for example, BRUGGOLITE™ FF6 and BRUGGOLITE™ FF7 reductants, which are comprising mixtures of 2-hydroxy-2-sulfinatoacetic acid and 2-hydroxy-2-sulfonatoacetic acid, available from L. Brüggemann KG (Heilbronn, Germany).

Redox reaction catalyzing metal salts of iron, copper, manganese, silver, platinum, vanadium, nickel, chromium, palladium, or cobalt may be used at levels of from 0.05 ppm or more and up to 20 ppm, based on the total weight of the aqueous polymer dispersion. Combinations of iron and copper may be preferable.

The first polymer may be formed in the presence of 0.1 or more wt. % and up to 10 wt. %, based on the total weight of the first polymer, of one or more non-ionic or weak acid surfactants. Examples of such surfactants include, for example, ethoxylated alcohols or phenols and ethoxylated fatty acids or fatty glycerides. Non-ionic surfactants are preferred. Polymerizable non-ionic surfactants may be used.

In yet still another preferred embodiment, the first polymer is formed in the presence of one or more neutralizers, especially in embodiments wherein the first polymer is formed from monomers comprising ethylenically unsaturated acid monomers bearing 1 or 2 carboxylic acid groups per molecule, such as acrylic, methacrylic and itaconic acids. Suitable neutralizers include, for example, ammonia, sodium hydroxide, potassium carbonate, and sodium bicarbonate. The one or more neutralizers may be used in amounts of 5 wt. % or more and up to 75 wt. %, preferably up to 50 wt. %, more preferably 10 wt. % or more, or 20% or more, 30% or more on an equivalents basis, based on the equivalents of ethylenically unsaturated acid monomer. The neutralizing agent(s) may be added to the polymerization vessel at any time before or during polymerization of monomers used to form the first polymer. For instance, neutralizing agent(s) may be added in a single charge prior to any polymerization of monomers used to form the first polymer, after the formation of some portion of the first polymer, gradually during the polymerization of monomers used to form the first polymer, or combinations thereof.

The one or more second polymers may be formed by emulsion polymerization of one or more ethylenically unsaturated monomers bearing one or more epoxy groups in the presence of an aqueous dispersion of the one or more first polymers. In preferred embodiments, the monomers used to form the second polymer comprise one or more ethylenically unsaturated nonionic monomers and comprise from 1 to 90wt. %, preferably 1 wt. % or more and up to 50 wt. %, more preferably, 10 wt. % or more and up to 50 wt. %, based on the total weight of monomers used to form the second polymer, of one or more ethylenically unsaturated monomers bearing one or more epoxy groups. Preferably, 1 wt. % or less, 0.5 wt. % or less, 0.1 wt. % or less of any ethylenically unsaturated acid monomer is used in the formation of the second polymer. Most preferably, there is no ethylenically unsaturated acid monomer used in the formation of the second polymer.

Preferred ethylenically unsaturated monomers bearing one or more epoxy groups include monoethylenically unsaturated monoepoxides. Suitable monoethylenically unsaturated monoepoxides include, for example, glycidyl cinnamates, glycidyl crotonates, glycidyl itaconates, glycidyl norbomenyl ester, glycidyl norbornenyl ether and the like. More preferred monoethylenically unsaturated monoepoxides include glycidyl (meth)acrylate and allyl glycidyl ether.

The second polymer may preferably be formed in the presence of 0.1 wt. % or less, more preferably 0.05 wt. % or less, most preferably 0 wt. %, of strong acid initiators, by weight, based on the total combined weight of first and second polymers.

It is further preferred that the second polymer be formed in the presence of 0.5% or less, more preferably 0.3% or less, most preferably 0 wt. %, based on the total combined weight of first and second polymers, strong acid surfactant.

Monomers used to form first or second polymers may be polymerized by shot or gradual addition processes. In some embodiments, it may be desirable to use some combination of shot and gradual addition techniques. The monomer mixture(s) may be added neat or as an emulsion in water. The monomer mixture(s) may be added in one or more additions or continuously, linearly or not, over the reaction period, or combinations thereof. Preferably, the second monomer mixture is polymerized in a shot polymerization, or a series of shot polymerizations in the presence of the first polymer.

The second monomer mixture is polymerized in the presence of an aqueous dispersion of the first polymer(s). Preferably, the second monomer mixture is added to an aqueous dispersion of the first polymer, allowed adequate time to diffuse into the particles of the first polymer, and subsequently caused to polymerize. Further, during the addition of the monomers used to form the second polymer, the pH of the aqueous dispersion preferably ranges from 6 to 8 more preferably, 6.5 or more and up to 7.5.

The second monomer mixture may preferably be added to the aqueous dispersion at as low a temperature as is practicable, for example, below 70° C., more preferably below 60° C., yet more preferably below 50° C., and most preferably below 40° C. Preferably, 50 wt. % or more, more preferably, 75 wt. % or more, yet more preferably, 90 wt. % or more, and, most preferably, all of the monomers used to form the second polymer are polymerized below 70° C., more preferably, below 65° C., yet more preferably below 60° C.

In another preferred embodiment, the second monomer mixture is caused to polymerize in the presence of 0.01 wt. % or more and up to 5 wt. %, preferably 0.05 wt. % or more and up to 3 wt. %, yet more preferably, 0.05 wt. % or more and up to 0.5 wt. %, based on the weight of the second monomer mixture, of one or more free radical initiators that do not contain, or form upon reaction in emulsion polymerization, strong-acid groups. More preferably, such initiators serve as oxidants in redox initiation systems comprising one or more oxidants and 0.01 wt. % or more and up to 3.0 wt. %, based on the weight of monomers used to form the second polymer, one or more reductants. Preferred oxidants, reductants, redox reaction catalyzing metal salts, and their relative quantities are the same as those specified herein with regard to formation of the first polymer.

Preferably, the aqueous dispersion comprises total first polymer(s) to total second polymer(s) in weight ratios of 10:90 or more and up to 90:10, more preferably 25:75 or more and up to 75:25.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the first and/or second polymer(s) formed by the polymerization of ethylenically unsaturated monomers and/or to provide a different molecular weight distribution than would have been obtained in their absence.

Suitable molecular weights for first and second polymers, for example, may include Mw's ranging from of 500,000 or more and up to 1,000,000, or 100,000 or more and up to 500,000, or 10,000 or more and up to 100,000. The first polymer of the invention may comprise from 5 to 40 wt. %, based on the total weight of first polymer, polymer having Mn of from 1,000 to 10,000.

The aqueous polymer dispersions retain 90 mole % or more, preferably 95 mole % or more, most preferably 98 mole % or more retention of epoxy groups, based on the total moles of epoxy groups in the second monomer mixture, after storage in a sealed container, at a pH of 7.0 or greater, for 10 days at 60° C. Preferably, the same percentages of epoxy groups will be retained after the dispersions are stored in a sealed container for 10 days at 60° C. at a pH of 7.5 or greater, more preferably, at a pH of 8.0 or greater, yet more preferably, at a pH of 8.5 or greater, and, most preferably, at a pH of 9.0 or greater. One can determinine the concentration of epoxy groups in a dispersion polymer via Nuclear Magnetic Resonance (NMR) spectroscopy.

The multi-stage polymers preferably have particle sizes of from 40 to 1000 nm, more preferably from 40 to 600 nm, yet more preferably from 40 to 300 nm. The aqueous dispersions of the invention may comprise bimodal, multi-modal, or broad particle size distributions. The Tg of the first polymer or the second polymer may be in the range of from −60° C. to 150° C.

The multi-stage polymers can be used in combination with crosslinkers, said crosslinkers bearing two or more groups capable of reacting with epoxy groups. Examples of suitable crosslinkers include, for example, polycarboxylic acids or polyamines. Polyamines include, for example, $C_2$-$C_{12}$ diamines and triamines, aromatic diamines and triamines, and polyamines such as polyvinylamine or polyethyleneimine. Examples of suitable polyamines include ethylene diamine, diethylenetriamine, triethylenetetramine, propylenediamine, butylenediamine, hexamethylenediamine, cyclohexylenediamine, phenylenediamine, tolylenediamine, xylylene diamine, tris(2-aminoethyl)amine, isophoronediamine, diethylenetriamine, cyclohexyldiamine, 2-methyl-1,5-pentanediamine, poly(oxyethylene)diamine, poly(oxypropylene)diamine, poly(oxyethylene/oxypropylene)diamine, poly(oxypropylene)triamine. Polycarboxylic acids include, for example, $C_2$-$C_{12}$ dicarboxylic acids and tricarboxylic acids, aromatic dicarboxylic acids and tricarboxylic acids and polyacids such as poly(meth)acrylic acids and acid functional polyesters. Examples of suitable polycarboxylic acids include oxalic acid, malonic acid, methylmalonic acid, ethylmalonic acid, succinic acid, glutaric acid, adipic acid, pimelic acid, suberic acid, azelaic acid, sebacic acid, tetrafluorosuccinic acid, bromosuccinic acid, gluconic acid, malic acid, tartaric acid, mucic acid, citric acid, alginic acid, diglycolic acid, tetrahydrofuran-2,3,4,5-tetracarboxylic acid, dithiobutylic acid, 3,3'dithiodipropionic acid, 1,3-acetonedicarboxylic acid, 3-oxoadipic acid, 1,1-cyclohexanediacetic acid, 3,3-tetramethyleneglutaric acid, camphoric acid, cyclohexanedicarboxylic acid, 1,3,5-cyclohexanetricarboxylic acid, benzenedicarboxylic acid, benzenetricarboxylic acid. Further suitable crosslinkers may comprise, for example, hydroxyl functional polyesters, polypeptides, such as polyaspartic acids and their co-peptides, and polyamides, such as polycaprolactam.

Optionally, cure catalysts may be used with the inventive polymers, for example, acids and bases to accelerate the reactions of epoxides. In embodiments where epoxide groups react with other epoxide groups, examples of preferred catalysts are tris(dimethylaminomethyl) phenol, dimethylaminomethyl phenol, 1-propylimidazole, 2-methylimidazole, 2-ethyl-4-methylimidazole and derivatives, triethylenediamine, boron trifluoride, and monoethylamine. For the reaction of epoxies with hydroxyl containing compounds, quartenary amines are preferred catalysts. Examples of preferred catalysts for the reaction of epoxies with anhydride containing compounds include tris(dimethylaminomethyl) phenol, dimethylaminomethyl phenol, nonylphenol, phenol, paratoluene sulfonic acid, phosphoric acid, butyl phosphoric acid, acid ethyl phosphate, and salicylic acid are examples of preferred catalysts for the reaction of epoxies with amine containing compounds. 1-propylimidazole, 2-methylimidazole, 2-ethyl-4-methylimidazole, and derivatives, quaternary bases, boron trifluoride, and monoethylamine.

The inventive dispersions may be useful in the formation of aqueous coating compositions, adhesives and powder coatings. Powder coatings may be formed by known methods of removing water from the inventive dispersions, such by spray drying or coagulating one or more inventive dispersion, dewatering the dispersion, e.g. in a devolatilizing extruder, or via freeze drying the dispersion, especially those formed in the absence of added surfactants or dispersants. If needed, the product so obtained by coagulating, spray drying, dewatering, or freeze drying may further be ground or jet milled to an average particle size of 5 μm or more, preferably 10 μm or more, and more preferably 15 μm or more. Powder coatings of the present invention may have average particle sizes of up to 120 μm, preferably up to 60 μm, more preferably up to 40 μm.

Aqueous coating compositions and adhesives may further comprise rheology modifiers; coalescents; solvents; biocides; wetting agents; defoamers; dyes; humectants; waxes; surfactants; fillers or extenders; colorants; flatting agents; neutralizers; buffers; freeze-thaw additives; plasticizers; antifoaming agents; tackifiers; hindered amine light stabilizers; UV absorbers, such as benzophenone, substituted benzophenones, and substituted acetophenones; dispersants; anti-oxidants; and pigments.

Examples of suitable pigments and extenders include titanium dioxide such as anatase and rutile titanium dioxides and opaque polymers; zinc oxide; antimony oxide; iron oxide; magnesium silicate; calcium carbonate; organic and inorganic colored pigments; aluminosilcates; silica; various clays such as kaolin and delaminated clay; and lead oxide. Suitable aqueous polymer dispersion compositions may optionally contain opaque polymer particles, such as ROPAQUE™ Opaque Polymers (Rohm and Haas Co., Philadelphia, Pa.), which are useful for further improving the dry hiding of coating prepared from the aqueous polymer blend composition of this invention. In addition, extender particles with low oil absorption values are optionally added to the aqueous polymer blend composition of the invention, such as, for example, EXPANCEL™ 551 DE20 acrylonitrile/vinyl chloride expanded particles (Expancel Inc., Duluth Ga.); SIL- CELL™ 35/34 sodium potassium aluminum silicate particles (Silbrico Corporation, Hodgkins Ill.); DUALITE™ 27 polyvinylidene chloride copolymer coated with $CaCO_3$ (Pierce and Stevens Corporation, Buffalo N.Y.); FILLITTE™ 150 ceramic spherical particles (Trelleborg Fillite Inc., Norcross Ga.); MICROBEADS™ 4A soda lime particles (Cataphote Inc.); SPHERICEL™ hollow glass particles (Potter Industries Inc. Valley Forge Pa.); ECCOSPHERE™ hollow glass spheres (New Metals & Chemicals Ltd.; Essex England ); Z-LIGHT™ Sphere W-1200 ceramic hollow spheres (3M,St. Paul, Minn.); SCOTCHLITE™ K46 glass bubbles (3M, St. Paul, Minn.); VISTAMER™ UH 1500 polyethylene particles and VISTAMER™ HD 1800 polyethylene particles (Fluoro-Seal Inc, Houston Tex.).

The amounts of pigment and extender in the aqueous polymer blend composition vary from a pigment volume concentration (PVC) of 0 to 85 and thereby encompass coatings such as, for example, as clear coatings, stains, flat coatings, satin coatings, semi-gloss coatings, gloss coatings, primers, textured coatings, and the like. Typically, higher PVCs result in coatings having lower gloss. The PVC is calculated by the following formula:

$$PVC(\%) = \frac{(\text{volume of pigments}(s) + \text{volume extender}(s)) \times 100}{\text{total dry volume of paint}}.$$

Paints or coatings may comprise one or more volatile organic compounds or VOC's to improve the film formation properties of coatings or to aid in the application properties of the composition employed to prepare the coating. Examples of suitable VOCs include glycol ethers, organic esters, aromatic compounds, ethylene and propylene glycol, and aliphatic hydrocarbons. The inventive dispersions are particularly useful in the formation of aqueous coating compositions having 5% or less VOC; 3% or less VOC; 1.7% or less VOC by weight based on the total weight of the aqueous coating composition.

In some embodiments, aqueous coating compositions comprising the inventive dispersions have a PVC of 38 or less and, further, have 5 wt. % or less VOC, or 3 wt. % or less VOC, or 1.7 wt. % VOC or less, based on the total weight of the aqueous coating composition.

In other embodiments, aqueous coating compositions comprising the inventive dispersions have a PVC of 35 or more and have 3 wt. % or less VOC; 1.7 wt. % or less VOC, based on the total weight of the aqueous coating composition. In additional embodiments, aqueous coating compositions comprising the inventive dispersion have a PVC of 85 or less and has 1.7 wt. % or less VOC, 0.5 wt. % or less VOC, or 0.1 wt. % or less VOC, based on the total weight of the aqueous coating composition.

In coating formulations having 5 wt. % or less VOC, based on the total weight of the aqueous coating composition, the Tg of the first polymer may range from 10 to 55° C. In coating formulations having 3 wt. % or less VOC, based on the total weight of the aqueous coating composition, the first polymer may have a Tg of from 5 to 40° C. In coating formulations having 1.7 wt. % or less VOC, based on the total weight of the aqueous coating composition, the first polymer may have a Tg of from −5 to 25° C. In coating formulations having 0.5 wt. % or less VOC, based on the total weight of the aqueous coating composition, the first polymer may have a Tg of from −10 to 10° C.

Powder coating compositions may comprise curing agents, such as polyepoxides, e.g. triglycidyl isocyanurate (TGIC), epoxy novolacs, unsaturated polyesters, vinyl ether terminated (poly)urethanes and β-hydroxyalkylamides, such as those made by the methods disclosed in U.S. Pat. No. 4,076,917, to Swift et al.; pigments, colorants and/or fillers; flow modifiers, such as (meth)acrylate copolymers; matting agents, such as acid functional (meth)acrylate copolymers and waxes; dry flow aids; degassing agents; hindered amine light stabilizers; UV absorbers such as benzophenone, substituted benzophenones, and substituted acetophenones; dispersants and anti-oxidants.

In the following Example, the following test method was used: Determination of Epoxide Concentration: Proton NMR analysis (500 MHz, Bruker Avance 500 NMR spectrometer, Bruker Biospin Corp., Billerica, Mass.) was performed on latex polymers that were dissolved in deuterated tetrahydrofuran (1 drop deuterium oxide and tetramethysilane added). Comparison of the epoxide signal integration at 2.7 ppm to the integration of the acrylic ester methylene group at 4.1 ppm revealed the mole % of intact epoxide groups present in the emulsion polymer product.

Heat Age Testing—Emulsion polymers were heat aged for 10 days in fully filled Teflon™ fluoropolymer (DuPont, Wilmington, Del.) tape sealed glass containers fitted with a threaded screw cap top, in an oven maintained at 60° C. to determine the stability of the epoxide groups.

EXAMPLES

All procedures are performed at STP unless otherwise indicated. Surfactant A is a 31 wt. % aqueous solution of a mixture of surfactants comprising sodium ethoxylated $C_{10}$-$C_{16}$ alkyl ether sulfates, having approximately 3-7 ethylene oxide units per molecule.

Surfactant B is a 70 wt. % aqueous solution of a mixture of surfactants comprising ethoxylated octylphenol, having approximately 35 ethylene oxide units per molecule.

Comparative Example 1

Preparation of 2 Stage Emulsion Polymer with Strong Acid Initiator

Monomer Emulsion 1—Surfactant A (39.5 g) was dissolved in deionized water (322 g), with stirring. An emulsified monomer mixture was prepared by adding the following monomers slowly to the agitated solution; Butyl acrylate (498 g), Methyl methacrylate (352 g), Methacrylic acid (17.5 g).

Monomer Emulsion 2—Surfactant A (39.5 g) was dissolved in deionized water (322 g), with stirring. An emulsified monomer mixture was prepared by adding the following monomers slowly to the agitated solution; Butyl acrylate (503 g), Methyl methacrylate (269 g), Glycidyl methacrylate (87 g).

A solution containing Surfactant A (6.9 g) and deionized water (800 g) was placed in a 4-necked, 5 liter round bottom flask equipped with a thermocouple, a cooling condenser and an agitator, and heated to 88 C. under nitrogen. An aqueous sodium carbonate solution (2 g sodium carbonate in 10 g deionized water), aqueous sodium persulfate (SPS) initiator solution (5.2 g SPS in 26 g deionized water), and 3.1% of Monomer Emulsion 1 were added to the flask. Within about 5 minutes, initiation of polymerization was confirmed by the increase of temperature by 3° C. and a change of the external appearance of the reaction mixture. After generation of heat had ended, the remainder of the Monomer Emulsion 1 was added gradually to the flask over a period of 70 minutes, with stirring. Polymerization reaction temperature was maintained at 85-87° C. After completing the addition, the vessel that contained Monomer Emulsion 1 and feeding pipes leading into the flask were rinsed with 41 g deionized water, and the rinse was added back to the flask. The polymerization product was neutralized to pH=5.0 with sodium hydroxide. Monomer Emulsion 2 was then added in the same manner as Monomer Emulsion 1 over 70 minutes. Upon complete addition, the reaction mixture was cooled to 70° C. before addition of iron sulfate (1.6 g of a 0.15% solution), t-butylhydroperoxide (70%, 1.37 g in 20 g water) and BRUGGOLITE™ FF6 reductant (1 g in 20 g water). The reaction mixture was held at 70° C. for 30 minutes before commencing the gradual addition of solutions of TBHP (70%, 0.5 g in 5 g water) and BRUGGOLITE™ FF6 reductant (0.3 g in 5g water) over 30 minutes. Upon completion of the feeds, the reaction was cooled to room temperature. The resulting polymer emulsion (52.1% solids, pH=7.2, 117 nm particle size) was characterized by Proton NMR Analysis to contain 72% of the epoxide groups added to the reaction mixture in the form of glycidyl methacrylate.

A portion of the polymer emulsion was adjusted to pH 9.2 through the addition of ammonia, and the neutralized portion was subsequently stored in a fully filled Teflon™ fluoropolymer (DuPont, Wilmington, Del.) tape sealed glass container fitted with a threaded poly(etheretherketone) plastic screw cap top at 60° C. for 10 days. Proton NMR Analysis detected no epoxy groups in the sample after this treatment.

Example 1

Preparation of 1 Stare Emulsion Polymer without Strong Acid Initiator

Monomer Emulsion—Surfactant B (73 g) was dissolved in deionized water (800 g). An emulsified monomer mixture was prepared by adding the following monomers slowly to the agitated solution; Butyl acrylate (100 g), Methyl methacrylate (626 g), Methacrylic acid (17.5 g), Glycidyl methacrylate (87 g), Sodium Carbonate (2 g).

A solution containing Surfactant B (4.5 g) and deionized water (800 g) were placed in a 4-necked, 5 liter round bottom flask equipped with a thermocouple, a cooling condenser and an agitator, and heated to 65 C. under nitrogen. Iron sulfate (7.2 g of a 0.15% solution), nitrilotriacetic acid trisodium salt (1 g of a 1% solution in water) and 3.1% of Monomer Emulsion were added to the flask, along with 10% of the redox initiator couple that consisted of a solution of t-butylhydroperoxide (70%, 5.1 g in 100 g DI water) and a solution of BRUGGOLITE™ FF6 reductant (2.4 g in 103 g DI water). Within about 5 minutes, initiation of polymerization was confirmed by the increase of temperature by about 3° C. and change of the external appearance of the reaction mixture. After generation of heat had ended, the remainder of the Monomer Emulsion and the redox couple solutions were added gradually to the flask with stirring over a period of 90 minutes. The polymerization reaction temperature was maintained at 65-67° C. After completing the addition, the vessel that contained the Monomer Emulsion and the feeding pipes leading into the flask were rinsed with 41 g deionized water, and the rinse was added back to the flask.

Upon completion of the additions the reaction mixture was cooled to 60° C. before addition of t-butylhydroperoxide (70%, 0.5 g in 5 g water) and BRUGGOLITE™ FF6 reductant (0.3 g in 5 g water). The reaction mixture was held with stirring at 60 C. for 30 minutes before commencing the gradual addition of solutions of TBHP (70%, 0.5 g in 50 g water) and BRUGGOLITE™ FF6 reductant (0.3 g in 50 g water) over 20 minutes, with stirring. Upon completion of the feeds, the reaction was cooled to room temperature. The resulting polymer emulsion (50.0% solids, pH=7.0, 207 nm particle size) was characterized by Proton NMR Analysis to contain 100% of the epoxide groups added to the reaction mixture in the form of glycidyl methacrylate. After heat age testing the epoxide groups were reduced to 94% of the amount added to the polymerization.

A portion of the polymer emulsion was adjusted to pH 9.2 through the addition of ammonia and subsequently stored in a fully filled Teflon™ fluoropolymer (DuPont, Wilmington, Del.) tape sealed glass container fitted with a threaded poly (etheretherketone) plastic screw cap top at 60° C. for 10 days. This sample was subsequently characterized by Proton NMR Analysis to contain approximately 94% of the epoxide groups added to the reaction mixture in the form of glycidyl methacrylate.

Example 2

Preparation of 2 Stage Emulsion Polymer without Strong Acid Initiator

Monomer Emulsion 1—Surfactant B (38 g) was dissolved in deionized water (322 g). Emulsified monomer mixture was prepared by adding the following monomers slowly to the agitated solution; Butyl acrylate (498 g), Methyl methacrylate (352 g), Methacrylic acid (17.5 g), Sodium Carbonate (2 g).

Monomer Emulsion 2—Surfactant B (35 g) was dissolved in deionized water (322 g). Emulsified monomer mixture was prepared by adding the following monomers slowly to the agitated solution; Butyl acrylate (503 g), Methyl methacrylate (269 g), Glycidyl methacrylate (87 g).

A solution containing Surfactant B (4.5 g) and deionized water (800 g) was placed in a 4-necked, 5 liter round bottom flask reactor equipped with a thermocouple, a cooling condenser and an agitator, and heated to 65 C. under nitrogen. Iron sulfate (7.2 g of a 0.15% solution), nitrilotriacetic acid trisodium salt (1 g, 1% solution in water) and 3.1% of Monomer Emulsion 1 were added with stirring to the reactor, along with 10% of the redox initiator couple that consisted of a solution of t-butylhydroperoxide (70%, 2.5 g in 50 g DI water) and a solution of BRUGGOLITE™ FF6 reductant (1.3 g in 50 g DI water). Within about 5 minutes, initiation of polymerization was confirmed by the increase of temperature by about 3° C. and change of the external appearance of the reaction mixture. After generation of heat had ended, the remainder of the Monomer Emulsion 1 and the redox couple solutions were added to the reactor over a period of 45 minutes, with stirring. Polymerization reaction temperature was maintained at 65-67° C. After completing the addition, the vessel that contained Monomer Emulsion 1 and the feeding pipes leading into the reactor were rinsed with 30 g deionized water, and the rinse was added back to the reactor. The polymerization product was cooled to 30 C. and neutralized to pH=7.0 with sodium hydroxide. Monomer Emulsion 2 was then added over 15 minutes before addition of t-butylhydroperoxide (TBHP, 70%, 2.6 g in 50 g water) and BRUGGOLITE™FF6 reductant (1.2 g in 50 g water), with stirring. The reaction mixture was allowed to heat up to 57° C. before cooling was initiated to maintain the temperature below 60° C. After the peak reaction heating had passed, the reaction mixture was held at temperature for 30 minutes before commencing the gradual addition of solutions of TBHP (70%, 0.5 g in 5 g water) and BRUGGOLITE™ FF6 reductant (0.3 g in 5 g water) over 20 minutes, with stirring. Upon completion of the feeds, the reaction was cooled to room temperature.

The resulting polymer emulsion (49.2% solids, pH=7.2, 208 nm particle size) was characterized by Proton NMR Analysis to contain 100% of the epoxide groups added to the reaction mixture in the form of glycidyl methacrylate. After heat age testing the quantity of epoxide groups was unchanged.

A portion of the polymer emulsion was adjusted to pH 9.2 through the addition of ammonia. A second portion of the polymer emulsion was adjusted to pH 9.2 through the addition of sodium hydroxide. A third portion of the polymer emulsion was adjusted to pH 9.2 through the addition 2-methylpentamethylene-diamine. Each of these three samples was subsequently stored in a fully filled Teflon™ fluoropolymer (DuPont, Wilmington, Del.) tape sealed glass container fitted with a threaded metal screw cap top at 60° C. for 10 days. After heat ageing each of the samples was characterized by Proton NMR Analysis to contain 98 to 100% of the epoxide groups added to the reaction mixture in the form of glycidyl methacrylate.

Comparative Example 2

Preparation of 1 Stage Emulsion Polymer with Strong Acid Initiator

The preparation of the emulsion polymer of Comparative Example 2 was identical to the preparation method used in Example 1, with the reaction initiators changed to Ammonium Persulfate (9 g in 180 g DI water) and a solution of sodium hydrosulfite (1.6 g in 180 g DI water)

The polymer (49.2% solids, pH=7. 1, 157 nm particle size) was characterized by Proton NMR Analysis to contain 93% of the epoxide groups added to the reaction mixture in the form of glycidyl methacrylate. After heat age testing the epoxide groups were reduced to 85% of the amount added to the polymerization.

A portion of the polymer emulsion was adjusted to pH 9.2 through the addition of ammonia and subsequently stored in a fuilly filled Teflon™ fluoropolymer (DuPont, Wilmington, Del.) tape sealed glass container fitted with a threaded poly (etheretherketone) plastic screw cap top at 60° C. for 10 days. Proton NMR Analysis detected no epoxy groups in the sample after this treatment.

Comparative Example 3

Preparation of 2 Stage Emulsion Polymer with Strong Acid Initiator

Preparation of the emulsion polymer of Comparative Example 3 was identical to the preparation method used in Example 2, with the reaction initiators used for the polymerization of Monomer Emulsion 1 changed to Ammonium Persulfate (4.4 g in 100 g DI water) and a solution of Sodium Hydrosulfite (1.0 g in 100 g DI water) and the reaction initiators used for the polymerization of Monomer Emulsion 2 changed to Ammonium Persulfate (4.6 g in 50 g water) and Sodium Hydrosulfite (1.0 g in 50 g water)

The resulting polymer emulsion (50.3% solids, pH=7.0, 204 nm particle size) was characterized by Proton NMR Analysis to contain 81% of the epoxide groups added to the reaction mixture in the form of glycidyl methacrylate. After heat age testing the epoxide groups were reduced to 26% of the amount added to the polymerization.

A portion of the polymer emulsion was adjusted to pH 9.2 through the addition of ammonia and subsequently stored in a fully filled Teflon™ fluoropolymer (DuPont, Wilmington, Del.) tape sealed glass container fitted with a threaded poly (etheretherketone) plastic screw cap top at 60° C. for 10 days. Proton NMR Analysis detected no epoxy groups in the sample after this treatment.

Example 3

Preparation of 2 Stage Emulsion Polymer without Strong Acid Initiator

Preparation of the emulsion polymer Example 3 was identical to the preparation methods used in Example 2, with the reaction initiators used for the polymerization of Monomer Emulsion 1 changed to t-butylhydroperoxide (70%, 2.5 g in 50 g DI water) and a solution of iso-ascorbic acid (1.1 g in 50 g DI water), and the reaction initiators used for the polymerization of Monomer Emulsion 2 changed to t-butylhydroperoxide (70%, 2.6 g in 50 g DI water) and a solution of iso-ascorbic acid (1.0 g in 50 g DI water).

Upon completion of the feeds, the reaction was cooled to room temperature. The resulting polymer emulsion (49.5% solids, pH=7.0, 210 nm particle size) was characterized by Proton NMR Analysis to contain 100% of the epoxide groups added to the reaction mixture in the form of glycidyl methacrylate. After heat age testing the epoxide groups were reduced to 87% of the amount added to the polymerization.

A portion of the polymer emulsion was adjusted to pH 9.2 through the addition of ammonia and subsequently stored in a fully filled TeflonI™ fluoropolymer (DuPont, Wilmington, Del.) tape sealed glass container fitted with a threaded metal screw cap top at 60° C. for 10 days. Proton NMR Analysis detected no epoxy groups in the sample after this treatment.

Example 4

Preparation of 2 Stage Emulsion Polymer without Strong Acid Initiator

An aqueous dispersion polymer was prepared in the same manner as was used in Example 2 and was then formulated into coatings as set forth in Examples 5, 6, 7 and 8.

In the following Examples 5, 6, 7, and 8, the following Test Methods were used for Film Properties:

Print: The dispersion or formulation is applied to an untreated aluminum panel with a 5 mil (0.13 mm) drawdown bar and cured for 1 week at 25° C. and 50% relative humidity. Upon completion of cure, 2 square panels with approximately 1.5" (3.8 cm) dimensions on each side are cut and a sandwich is prepared with the coated sides facing one another and with two single layers of cheesecloth placed in between the plates, i.e. a cheesecloth sandwich. The sample is placed under a 500 gram weight in a 60° C. oven for 60 minutes. The sample is then removed from the oven and the imprint of the cheesecloth into the surface of the coating is visually rated on a 0-10. A sample showing no indention in the print test scores a 10, while a score of 0 indicates a complete failure, the aluminum panel being visible through the film.

60 degree Gloss: The dispersion or formulation is applied to a "Leneta Plain White Chart" (The Leneta Company, Inc., Mahwah, N.J.) with a 3 mil (0.08 mm) drawdown bar and cured for 1 week at 25° C. and 50% relative humidity. Upon completion of cure the 60° gloss was measured with a Byk-Gardner gloss meter (Byk-Gardner Catalog No. 4600, BYK- Gardner GmbH, Geretsried, Germany) calibrated according to the manufacturer's instruction manual.

Abrasive scrub resistance: The dispersion or formulation is applied to a "Leneta Scrub Test Panel—Black" (Leneta P121-10N) with a 7 mil (0.18 mm) drawdown bar and cured for 1 week at 25° C. and 50% relative humidity. Upon completion of cure the test is performed on an Abrasion Tester (Byk Gardner) using a nylon bristle brush (Byk Gardner) and a 10 mil (0.25 mm) thick, by ½ inch (12.7 mm) wide metal shim upon which the chart is placed. After the coated chart is mounted into the apparatus, 10 grams of "Abrasive Scrub Medium" (Leneta, type SC-2) are placed on the coating's surface and the brush begins to cycle over the coating. The test continues until one complete line of failure is visible across the shim. The abrasive scrub medium is refreshed every 400 cycles.

Mechanical properties: The dispersion or formulation is applied to a "Leneta Release Chart (all black)" (Leneta RC-BC) with a 50 mil (1.27 mm) drawdown bar and cured for 1 week at 25° C. and 50% relative humidity. The sample is flipped approximately half way through the 1 week cure. Upon completion of cure the test is performed on a Tinius Olsen H10K-S (Tinius Olsen, Inc., Horsham, Pa.) mechanical testing device, calibrated according to the manufacturer's instructions, under tension. A dogbone shaped sample is pulled from its ends at 1 inch/minute (2.54 cm/minute).

Exmaple 5

Preparation and Evaluation of Pigmnented Coating Formulation

The following materials were charged to a 2 quart (1.89 l) stainless steel container:
420 grams of water
76.3 grams of TAMOL™ 731 A dispersant (Rohm and Haas Company, 100 Independence Mall West, Philadelphia, Pa. 19106-2399 USA)
14.0 grams of TRITON™ CF-10 surfactant (The Dow Chemical Company, Midland, Mich.)
7.0 grams of BUBBLE BREAKER™ 625 defoamer (Witco Corporation, Greenwich, Conn.)

The container was transferred to a Morehouse-Cowles W-12-1.5 dissolver (Morehouse-Cowles, Chino, Calif.), and under a low speed of 1000 rpm 1907.2 grams of TI-PURE™ R-706 titanium dioxide (E.I. du Pont de Nemours and Company) was added. The speed was then ramped up to 2800 rpm and the grinding operation continued for another 15 minutes. Once the grind was complete, 85.09 grams were transferred to a 1 pint (473 ml) paint container. The contents were then stirred using a bench top overhead mixer in a manner that maintained a vortex while adding the following ingredients in the order listed:
16.99 grams water
125.62 grams Emulsion Polymer of Example 4
0.25 grams TRITON™ GR-7M surfactant
0.25 grams BUBBLE BREAKER™ 625 defoamer
3.75 grams ACRYSOL™ RM-2020NPR urethane rheology modifier (Rohm and Haas Company, Philadelphia, Pa.)
5.60 grams ACRYSOL™ RM-8W urethane rheology modifier
29.00 grams water
0.40 grams ammonium hydroxide (28%)

Upon completion of these additions, the viscosity of the paint was determined to be 90 Krebs Units (KU), as measured with a STORMER™ Viscometer (BYK-Gardner GmbH, Geretsried, Germany). The pH of the paint was 9.2.

Test results were as follows: Print=9; Abrasive Scrubs, 1st line cut through =1843 cycles; 60 degree gloss=47; Mechanical properties—Stress at 50% elongation =251 psi (1730 kPa); Maximum stress=537 psi (3703 kPa); Elongation at break =540%.

Example 6

Preparation and Evaluation of Pigmented Coating Formulation with Crosslinker

The formulation of Example 6 was prepared in the same fashion as in Example 5, except to 85.09 grams of the grind of Example 5 were added, in order:
18.64 grams water
122.90 grams Emulsion Polymer of Example 4
1.07 grams 2-Methylpentamethylenediamine
0.25 grams TRITON™ GR-7M surfactant
0.25 grams BUBBLE BREAKER™ 625 defoamer 3.75 grams ACRYSOL™ RM-2020NPR urethane rheology modifier
7.00 grams ACRYSOL™ RM-8W urethane rheology modifier
28.00 grams water No ammonium hydroxide was added. Upon completion of these additions, the viscosity of the paint was determined to be 91 Krebs Units (KU), as measured with a STORMER™ Viscometer. The pH of the paint was 11.0.

Test results were as follows: Print=7; Abrasive Scrubs, 1st line cut through=1946 cycles; 60° gloss=59; Mechanical properties–Stress at 50% elongation=255 psi (1758 kPa); Maximum stress=565 psi (3896 kPa); Elongation at break=417%

Example 7

Preparation and Evaluation of Clear Film

To a ½ pint (237 ml) paint can, were added the following:
151.3 grams of the Emulsion polymer of Example 4
10.5 grams of 6% CELLOSIZE™ QP-3L hydroxyethyl cellulose (The Dow Chemical Company, Midland, Mich.) in water
13.3 grams of deionized (DI) water After all ingredients are added, the sample is stirred for 5 minutes. To remove unwanted entrapped air, the sample is centrifuged at 1000 rpm for 2 minutes.

Mechanical properties–Stress at 50% Elongation=55 psi (379 kPa); Maximum Stress=530 psi (3654 kPa); Elongation at break=795%

Example 8

Preparation and Evaluation of Clear Film

Example 8 was prepared in the same fashion as Example 7, using the following formulation.
151.3 grams of Emulsion polymer of Example 4
1.28 grams 2-Methylpentamethylenediamine premixed with 3.82 grams DI water
8.7 grams 60% CELLOSIZE™ QP-3L
9.9 grams DI water Mechanical properties–Stress at 50% Elongation=69 psi (476 kPa); Maximum Stress=726 psi (5006 kPa); Elongation at break=645%

We claim:

1. An aqueous polymer dispersion comprising multi-stage polymeric particles of from 20 to 80 wt. %, based on the weight of the said polymeric particles, of one or more first polymer formed by polymerizing a first monomer mixture of a) one or more non-ionic ethylenically unsaturated monomers and b) from 0.5 to 10 wt. %, based on the total weight of a) and b), of one or more ethylenically unsaturated acid monomers, and one or more second polymer formed by polymerization in the presence of an aqueous dispersion of the said one or more first polymer of a second monomer mixture comprising from 1 to 90 wt. %, based on the total weight of the said second monomer mixture, of one or more ethylenically unsaturated monomers bearing one or more epoxy groups, wherein 90 mole % or more of the said epoxy groups, based on the moles of epoxy groups in the said second monomer mixture, are retained in the aqueous dispersion after said dispersion is stored in a sealed container for 10 days at 60° C.

2. An aqueous polymer dispersion as claimed in claim 1, wherein the said first polymer is formed in the presence of 0.3 wt. % or less, based on the total weight of the first polymer, of a strong acid surfactant and in the presence of 0.1 wt. % or less, based on the total weight of the first polymer, of one or more initiator that contains strong acid groups or generates strong acid groups under polymerization conditions.

3. An aqueous polymer dispersion as claimed in claim 1, wherein the said first polymer is formed in the presence a quantity of neutralizing agent sufficient to neutralize 5% or more, on an equivalents basis, of the acid groups in the said first monomer mixture.

4. An aqueous polymer dispersion as claimed in claim 1, wherein said second polymer is formed in the presence of 0.1 wt. % or less, based on the total weight of the said first and second polymers, of one or more initiator that contains strong acid groups or generates strong acid groups under polymerization conditions.

5. An aqueous polymer dispersion as claimed in claim 1 wherein 50% or more of the said second monomer mixture are polymerized at temperatures of 70° C. or lower.

6. An aqueous polymer dispersion as claimed in claim 1, wherein said second polymer is formed in the presence of redox initiation systems comprising one or more oxidants and one or more sulfinic acid derivatives.

7. A composition comprising the polymer dispersion of claim 1 chosen from aqueous coating compositions, aqueous adhesive compositions and powder coating compositions.

8. A coating composition as claimed in claim 7 comprising one or more crosslinkers capable of reacting with epoxy groups.

9. A process for forming an aqueous polymer dispersion of multi-stage polymeric particles comprising;

providing an aqueous dispersion of one or more first polymer, and polymerizing in the presence of said 1) aqueous dispersion of one or more first polymer, 2) 0.3 wt. % or less, based on the total weight of the first polymer and the ingredients to form the second polymer, of one or more strong acid surfactant, and 3) 0.1 wt. % or less, based on the total weight of the first polymer and the ingredients to form the second polymer, of one or more initiator that contains strong acid groups or generates strong acid groups under the conditions of aqueous emulsion polymerization, a second monomer mixture comprising from 1 to 90 weight %, based on the total weight of the second monomer mixture, of one or more ethylenically unsaturated monomers bearing one or more epoxy groups, wherein 90 mole % or more of the said epoxy groups, based on the moles of epoxy groups in the said second monomer mixture, are retained in the aqueous dispersion after said dispersion is stored in a sealed container for 10 days at 60° C.

10. A process according to claim 9 wherein said first polymer is formed by aqueous polymerization of a first monomer mixture of one or more non-ionic ethylenically unsaturated monomers and from 0.5 to 10 wt. %, based on the total weight of said first polymer, one or more ethylenically unsaturated acid monomers.

11. The composition as claimed in claim 1, wherein the second polymer comprises no copolymerized ethylenically unsaturated acid monomer.

* * * * *